US007322558B2

(12) United States Patent
Cong

(10) Patent No.: US 7,322,558 B2

(45) Date of Patent: Jan. 29, 2008

(54) NON-REFILLABLE VALVE

(75) Inventor: Jing Jie Cong, Sheuyang (CN)

(73) Assignee: Discount Refrigerants, Inc., Castle Rock, CO (US)

( * ) Notice: Subject to any disclaimer, the term of this patent is extended or adjusted under 35 U.S.C. 154(b) by 274 days.

(21) Appl. No.: 11/223,411

(22) Filed: Oct. 20, 2005

(65) Prior Publication Data

US 2006/0081804 A1 Apr. 20, 2006

(51) Int. Cl.
*F16K 31/44* (2006.01)

(52) U.S. Cl. .................... 251/82; 251/284; 137/614.2; 137/797

(58) Field of Classification Search .................. 251/82, 251/284, 356; 137/797, 614.2, 614.18
See application file for complete search history.

(56) References Cited

U.S. PATENT DOCUMENTS

| | | | |
|---|---|---|---|
| 3,589,397 | A | 6/1971 | Wagner |
| 3,704,813 | A | 12/1972 | Devol |
| 3,985,332 | A | 10/1976 | Walker |
| 4,207,915 | A | 6/1980 | Becker et al. |
| 4,232,704 | A | 11/1980 | Becker et al. |
| 4,284,097 | A | 8/1981 | Becker et al. |
| 4,377,106 | A | 3/1983 | Workman et al. |
| 4,420,010 | A | 12/1983 | Becker et al. |
| 4,543,980 | A | 10/1985 | Van Der Sanden |
| 4,573,611 | A | 3/1986 | O'Connor |
| 4,697,611 | A | 10/1987 | Winland et al. |
| 4,813,575 | A | 3/1989 | O'Connor |
| 4,921,214 | A | 5/1990 | Jernberg |
| 4,934,654 | A | 6/1990 | Linnemann |
| 5,036,876 | A | 8/1991 | Jernberg |
| 5,067,520 | A | 11/1991 | Kremer et al. |
| 5,295,502 | A | 3/1994 | Lane |
| 5,467,798 | A | 11/1995 | Baker et al. |
| 5,657,790 | A | 8/1997 | Mohn |
| 5,794,660 | A | 8/1998 | Mohn |
| 5,944,054 | A | 8/1999 | Saieva |
| 6,082,393 | A | 7/2000 | Tye |
| 6,595,230 | B2 | 7/2003 | Raboin |
| 6,595,486 | B2 | 7/2003 | Chen |
| 6,808,159 | B1 | 10/2004 | Chen |
| 2003/0029508 | A1 | 2/2003 | Raboin |
| 2004/0060605 | A1 | 4/2004 | Jhurani |
| 2004/0144803 | A1 | 7/2004 | Baker |
| 2004/0188649 | A1 | 9/2004 | Heilmann et al. |
| 2005/0072464 | A1* | 4/2005 | Schmidt et al. ............... 137/71 |
| 2005/0082501 | A1 | 4/2005 | Chen |
| 2005/0109974 | A1 | 5/2005 | Antunes Guimaraes et al. |

* cited by examiner

*Primary Examiner*—John Bastianelli
(74) *Attorney, Agent, or Firm*—Sheridan Ross P.C.

(57) ABSTRACT

A non-refillable valve is provided that allows for an initial filling of a container, but prevents subsequent refilling of the container. In one embodiment, the valve includes a valve core having a retaining means for maintaining the valve core in an open or non-sealing position to allow flow through the valve and filling of the container. The valve core may then be advanced to seal the container, and subsequently selectively operated to discharge the container as desired. Further refilling of the container is prevented by the force of fluid reentering the valve which forces the valve core to its seated engagement with the valve seat.

20 Claims, 6 Drawing Sheets

NON-REFILLABLE VALVE

CROSS REFERENCE TO OTHER APPLICATIONS

Cross reference is made to U.S. patent application Ser. No. 10/971,335 filed Oct. 22, 2004, which is a continuation application of U.S. patent application Ser. No. 10/622,043 filed on Jul. 16, 2003, now U.S. Pat. No. 6,808,159 issued Oct. 26, 2004, which is a continuation application of U.S. patent application Ser. No. 09/948,328 filed on Sep. 6, 2001, now U.S. Pat. No. 6,595,486 issued, Jul. 22, 2003. The entire contents of the above referenced patent applications are incorporated herein by reference in their entirety.

FIELD OF THE INVENTION

This present invention relates to non-refillable valves used in pressurized systems. More particularly, the present invention relates to non-refillable valves adapted for use with pressurized vessels or containers wherein the construction of the valves allow the pressure container to be filled once, and then selectively discharged; however, subsequent refilling of the pressure container is prevented.

BACKGROUND OF THE INVENTION

Valves are commonly used to control the discharge of fluid from a pressure container or vessel. Typically, such valves include a handle or some other means by which a user can selectively control discharge of the container. Pressure containers may contain any number of products such as butane, propane, refrigerant gas, or any number of other types of industrial gases.

Due to governmental regulations in the United States, pressure containers containing refrigerants may only be filled once. Thus, such pressure containers can be initially charged or filled with the refrigerant; however, once the refrigerant has been discharged from the container, the container may not be refilled again.

There are a number of prior art valves which exist not only for use with non-refillable containers, but also refillable containers. One group of patents representative of valves which are used in conjunction with non-refillable containers include patents assigned to Amtrol, Inc., of West Warwick, R.I. One specific example includes the U.S. Pat. No. 4,813,375. This reference discloses a non-refillable valve including a housing with a central bore, and three distinct portions within the central bore of particular diameters. The lower portion of the central bore is narrower than a middle portion which in turn is narrower than an upper portion. The lower end of the valve housing sealingly engages the pressure container. A valve stem is rotatably positioned in the upper portion of the central bore. The valve stem itself includes a vertical bore formed in its bottom portion. A resilient valve sealing member is slidably received in the bore of the valve stem. When the pressure container is filled, a top rim portion of the sealing member is pressingly positioned in the upper portion of the central bore. After filling, the valve sealing member is pushed downward into the middle portion which allows the valve to contact a seating surface thus sealing the pressure container. A non-compressed top rim of the sealing member is wider than the upper portion of the central bore, which prevents the sealing member from moving back up into the upper portion of the central bore. If an attempt is made to refill the container, the sealing member engages the seating surface thus preventing refill. Additional U.S. patents disclosing similar valves include the U.S. Pat. Nos. 5,295,502; 4,573,611; and 5,036,876.

While the foregoing references may be adequate for their intended purposes, there is still a need for a valve of simple and reliable construction which prevents refilling of a pressure container.

SUMMARY OF THE INVENTION

One object of the present invention is to provide a non-refillable valve for pressure containers, for example, cylinders used in industrial applications to hold and store pressurized industrial gas. Another object of the invention is to provide a valve which easily permits discharge of the pressure container, but will automatically prevent refilling of the container without the user or operator of the valve having to further manipulate the valve. Another object of the invention is to provide the above described functionality with a valve of simple and reliable construction.

In accordance with a first embodiment of the present invention, the structure of the valve includes a valve body having a longitudinal chamber extending therethrough. A lower portion of the chamber communicates with the opening or orifice of a pressure container to which the valve is attached. A valve stem is positioned within the chamber. A handle is integral with an upper portion of the valve stem providing means for a user to manipulate the positioning of the valve stem within the chamber. A valve core is slidably received in a bore formed on the lower end of the valve stem. The valve core includes a sealing member formed on the lower portion thereof. A nozzle attaches to the valve body, the nozzle including an orifice or passageway which communicates with the chamber of the valve body. A transverse opening formed on the sidewall of the valve body communicates between the nozzle passageway and the chamber.

An inner concentric rim, flange, or protrusion is formed on the internal sidewall of the chamber adjacent the passageway of the nozzle. When the empty pressure container is to be filled with a pressurized fluid, the valve core is placed in a first open position wherein a larger diameter portion of the valve core flange resides in the chamber above the inner concentric rim. In this first position, fluid may flow through the nozzle passageway into a lower portion of the chamber, and then through an opening or orifice communicating with the pressure container. After the pressure container has been filled, the handle is operated to move the valve stem downwardly within the valve body thus forcing the valve core flange beyond the inner concentric rim. The valve stem can be moved to force the sealing member of the valve core against a valve seat which seals the pressure container, thus defining a second closed position.

In order to evacuate or empty the contents of the pressure container, the handle is unscrewed thereby raising the valve stem, and allowing the sealing member to be unseated from engagement with the valve seat. Fluid pressure raises the valve core allowing the fluid to escape the pressure container back through the lower portion of the chamber and back through the nozzle passageway.

Refilling of the pressure container is prevented even when the valve stem is raised to allow the sealing member to be unseated. This is accomplished due to contact between the upper surface of the valve core flange and the inner concentric rim, thereby preventing the valve core flange from being positioned above the inner concentric rim. A third position is therefore defined when the valve stem is raised to allow the valve core to be unseated from the valve seat. In this third position, the majority of the area of the nozzle passageway communicating with the chamber resides above the valve core flange. In other words, a transverse opening into the chamber is created where the nozzle intersects the internal sidewall of the chamber, and the majority the cross-sectional area of this opening lies above the inner concentric rim, and likewise, above the valve core flange. Therefore, a pressurized flow of fluid entering the nozzle passageway results in a greater majority of such flow entering the portion of the chamber above the valve core flange, thus forcing the flange downwardly, and thereby resulting in the sealing member engaging the valve seat. Because the valve core is freely slidable within the bore of the valve stem, there is no means by which to operate the handle in order to place the valve core back in its first position. In this manner, the valve of the present invention functions as a check valve to prevent refill of the container.

In addition to an inner concentric rim, other constricting structures can be provided to prevent the valve core from returning to its first position once a user closes the valve. For example, one or more arc like segments, or one or more protrusions may extend from the inner wall of the valve body into the chamber, thereby constituting the constriction which must be overcome by the particular sized valve core flange.

The valve core may be one integral unit made of a resilient material, such as natural or synthetic rubber. Alternatively, the valve core may include a valve core body, and a sealing member which includes a resilient sealing surface for engagement with the valve seat. The valve core flange can also be shaped to accommodate the particular constriction formed within the chamber. The valve core flange can be shaped or configured allowing it to be compressed or moved downwardly past the constriction without undue force, yet the valve core flange configuration makes it much more difficult to return the valve core to its first position. For example, the lower end of the valve core flange can be slightly tapered, while the upper end can have a distinct edge or corner preventing it from being easily forced upwardly beyond the constriction.

In accordance with a second embodiment of the invention, a valve is provided that includes a valve body having a chamber with an upper threaded portion and an unthreaded lower portion, the lower portion having a substantially uniform diameter. The valve further includes an operating assembly comprising a valve stem that cooperates with a valve core, wherein the valve core is held in an initial position by a retaining means, thus allowing a fluid to fill the cylinder or pressure container that is attached to the valve. The valve core and the valve stem may be advanced within the chamber by, for example, rotating a handle connected to or integral with the valve stem. The valve core may be one integral unit made of a resilient material, such as natural or synthetic rubber. Alternatively, the valve core may include a valve core body, and a sealing member which includes a resilient sealing surface for engagement with the valve seat.

As the valve stem advances, it seats a sealing portion or sealing member of the valve core against a valve seat at the distal end of the lower portion of the chamber of the valve body. This action also permanently disengages the retaining means, and allows the valve core to thereafter freely move longitudinally within the lower portion of the valve chamber in response to fluid pressure applied to the valve core. Therefore, upon opening the valve, the fluid pressure within the container forces the valve core to disengage from the valve seat, and the fluid from the container is released. The valve may be operated any number of times to selectively release the fluid from the container as desired. Upon attempted refilling of the container using a pressurized fluid, the valve core seats against the valve seat, thereby preventing fluid from refilling the container to which the valve is attached.

The second embodiment of the non-refillable valve also preferably includes a biasing member such as spring that is preferably located within a bore of the valve stem to urge the valve core toward the valve seat. The biasing member assists in positioning the valve core such that an upper surface of a flange of the valve core is sufficiently located to intercept pressurized fluid that is being used in an attempt to refill the container. The biasing member, therefore, preferably places the valve core flange below a majority of the cross-sectional area of the transverse opening leading to the fluid refill line. As a result, when refilling is attempted at pressures where the refilling fluid pressure exceeds the fluid pressure within the tank, the valve core is forced downward by fluid pressure acting on the flange of the valve core, and the sealing member of the valve core then seals the valve upon contacting the valve seat.

Various embodiments of the present invention are set forth in the attached figures and in the detailed description of the invention as provided herein and as embodied by the claims. It should be understood, however, that this Summary of the Invention may not contain all of the aspects and embodiments of the present invention, is not meant to be limiting or restrictive in any manner, and that the invention as disclosed herein is and will be understood by those of ordinary skill in the art to encompass obvious improvements and modifications thereto.

Other features and advantages of the invention will become apparent from a review of the drawings, taken in conjunction with the following written description.

The drawings are not necessarily to scale.

DETAILED DESCRIPTION OF THE INVENTION

Figure 1:
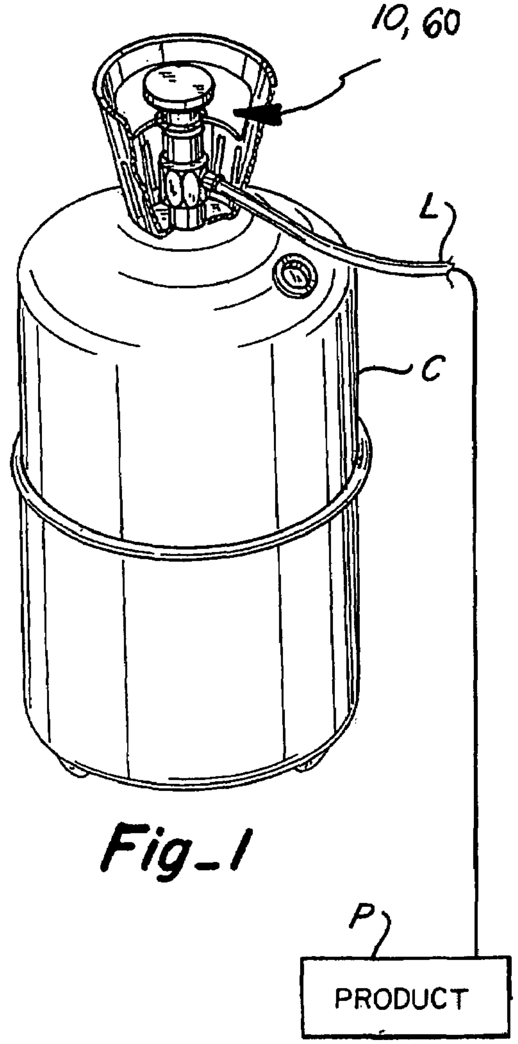
FIG. 1 is a perspective view of a pressure vessel or container receiving a flow of fluid from a product source, and illustrating a non-refillable valve in accordance with embodiments of the invention, wherein the valve is installed on the pressure container.

Referring to FIG. 1, a pressure container or pressure vessel C is provided with a non-refillable valve 10, 60 in accordance with embodiments of the present invention, wherein the valve 10, 60 permits initial filling and selective emptying of the container C. Valve 10, 60 can be welded, threaded or otherwise affixed to the container C. In order to fill the container, a product source P produces a flow of fluid through line L which communicates with the valve 10, 60. Container C simply represents a common industrial cylinder or tank which is specifically designed to hold a pressurized fluid/gas therein.

Figure 2:
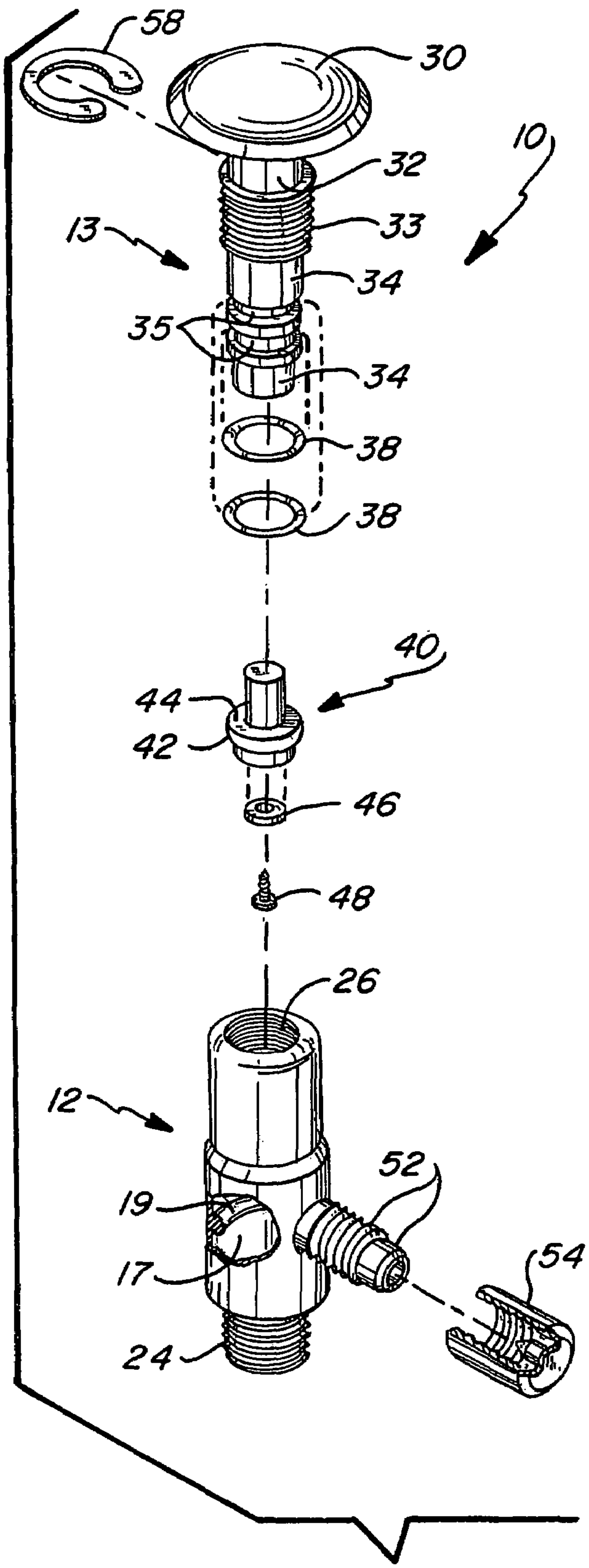
FIG. 2 is an exploded perspective view of a non-refillable valve in accordance with embodiments of the invention, the figure illustrating the component parts thereof including a fragmentary perspective view of the valve body.
Figure 4:
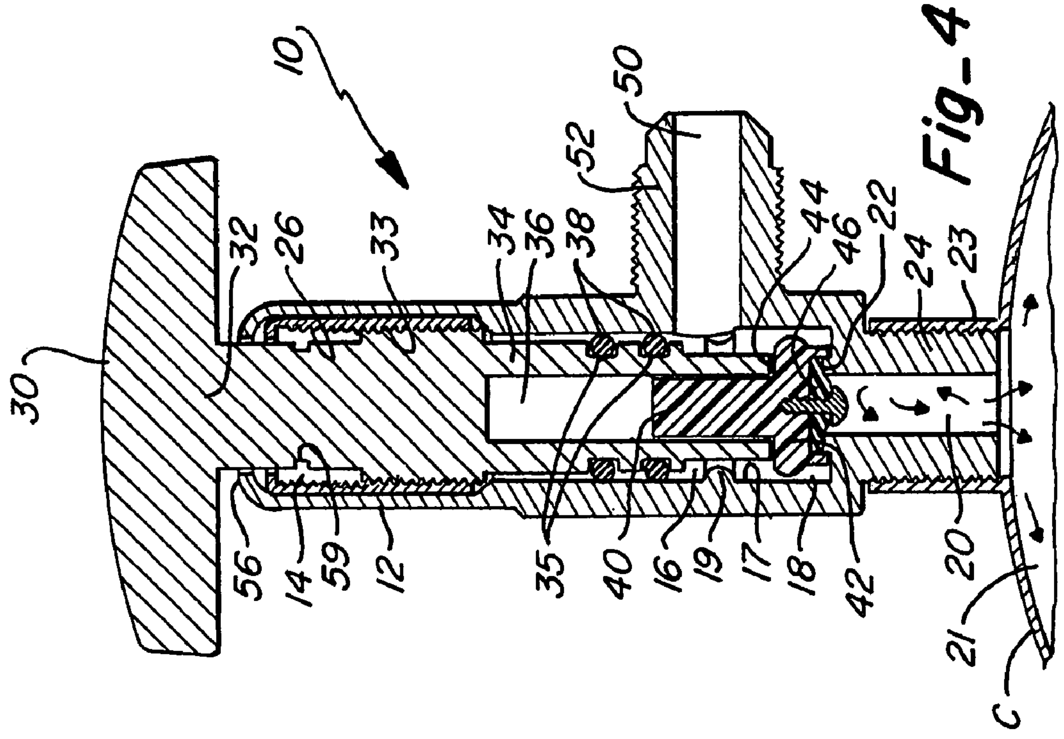
FIG. 4 is another vertical section illustrating the valve of FIG. 2 moved to its closed position.
Figure 3:
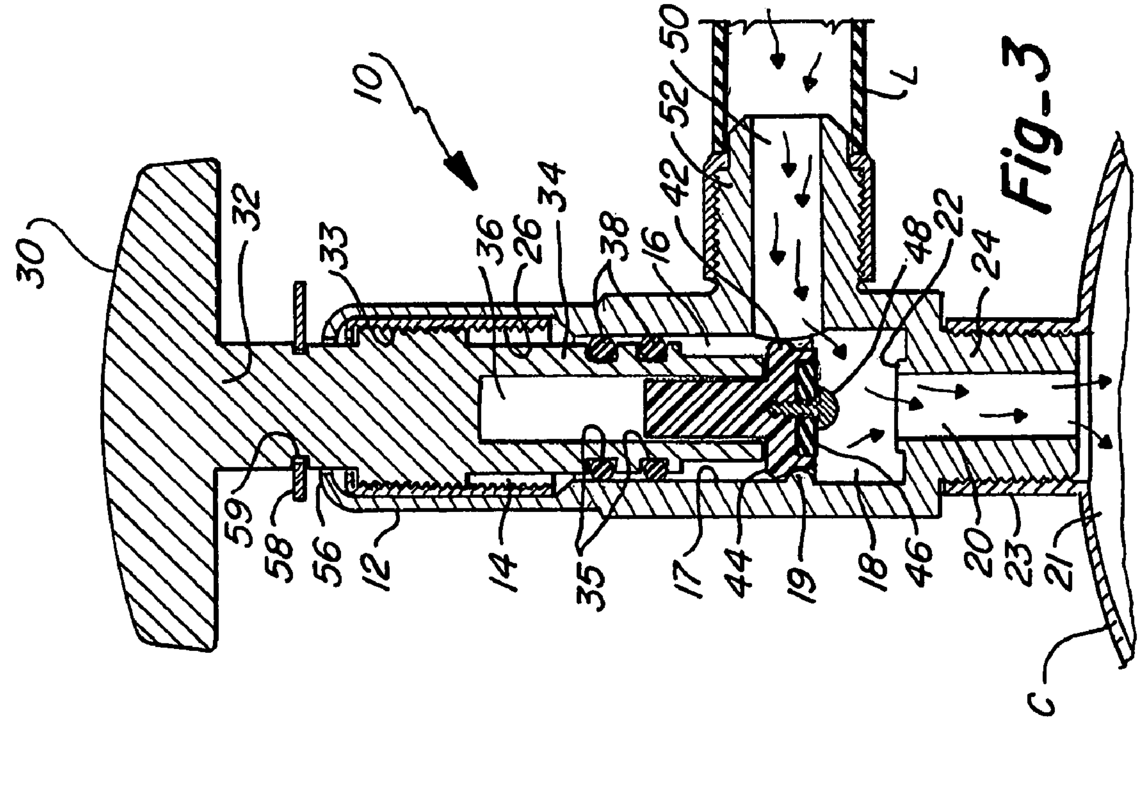
FIG. 3 is a vertical section illustrating the internal components of the valve of FIG. 2, and operation of the valve when the pressure container is being filled or charged.

Now referring to FIGS. 2 and 3, the primary components of a first embodiment of the present invention, namely valve 10, include a valve body 12 and a valve operating assembly 13, including a number of working parts which are received in the valve body when assembled. The valve body 12 is a cylindrical shaped member including a chamber extending longitudinally therethrough. When the valve operating assembly 13 is positioned within the chamber, the chamber can be conceptually separated into an upper portion 14, a middle portion 16, and a lower portion 18. As well understood by those skilled in the art, the valve body may be made of a suitable metal such as aluminum or stainless steel. The inner or interior surface 17 defining the chamber of the valve body includes a restriction or constriction 19, shown in the form of a machined inner concentric rim 19 formed on the inner surface 17. In lieu of a continuous concentric rim, this feature could include one or more segmented protrusions formed on the inner surface 17 which extend into the chamber and provide a narrowed or constricted area within the chamber. An orifice or passageway 20 communicates with the lower portion 18 of the chamber, and this passageway 20 communicates directly with the interior opening 21 of the pressure container. A valve seat 22 is provided at the interface or junction between lower portion 18 of the chamber and passageway 20. As shown in FIG. 3, the pressure container C includes an internally threaded neck 23 which receives the threaded extension 24 of the valve body.

The handle 30 is provided for manipulating the valve operating assembly. The handle 30 connects or is integral with a valve stem which extends into the chamber. An upper portion 32 of the valve stem resides in the upper portion 14 of the chamber. As shown, upper portion 32 has an externally threaded area 33 which is threaded into the upper portion 14 of the chamber which may include a set of matching internal threads. Alternatively, as shown in the Figures, the upper portion 14 of the chamber can have a cylindrical insert 26 which is press fit into the upper portion 14 of the chamber. Accordingly, the cylindrical insert 26 would be threaded on its interior surface to accommodate the external threads 33 of the valve stem. The lower portion 34 of the valve stem further extends into the middle portion 16 of the chamber. The lower portion 34 includes one or more grooves 35 which have O-rings 38 mounted thereover. The distal or lower end of the valve stem has a cylindrical bore 36 formed therein. As shown in FIG. 3, the bore 36 extends substantially the length of the lower portion 34 of the valve stem.

A valve core 40 is slidably received within the valve stem bore 36. Valve core 40 includes an upper cylindrical section which is received within the bore 36, and includes a valve core flange 42 having a larger cross sectional area or diameter in comparison to the upper cylindrical section of the valve core. The valve core 40 is further defined by a substantially flat upper edge 44 of the valve core flange 42. A sealing member 46 is attached to the distal end of the valve core 40. Sealing member 46 may be attached as by screw 48, or may be simply glued to the distal end of the valve core. A nozzle 52 extends transversely with respect to the longitudinal axis of the valve body 12. Nozzle 52 may simply be a cylindrical shaped extension including a passageway 50 which communicates directly with the chamber of the valve body. Passageway 50 is located to intersect with inner concentric rim 19. Therefore, inner concentric rim 19 terminates at the passageway 50. As also shown, a greater cross sectional area defining the passageway 50 extends above rim 19 as opposed to the cross sectional area of passageway 50 extending below rim 19.

After the valve operating assembly 13 is inserted within the chamber of the valve body, the upper end 56 of the valve body may be crimped to retain the valve operating assembly 13 therein. In order to prevent inadvertent actuation of handle 30, the safety clip 58 may be engaged in slot 59 to prevent the handle from being rotated. Additionally, a cap 54 may be provided to cover the nozzle 52 prior to use.

Now the operation of the valve will be explained with respect to FIGS. 3-6. FIG. 3 illustrates the valve 10 when the cylinder C is being filled. As shown, line L introduces a flow of fluid through passageway 50, through lower portion 18 of the chamber, through orifice 20 and into the interior opening 21 of the container C. The valve core 40 is positioned such that the valve core flange 42 resides above the inner concentric rim 19. After the container C has been filled, the retaining clip 58 is removed, and the handle 30 is operated to close the valve. Specifically, the handle is rotated causing the valve stem to displace downwardly into the chamber. As the valve stem moves, it forces the valve core flange 42 beyond the inner concentric rim 19. The valve core flange is of sufficient resiliency that it can be forced beyond the rim 19 without permanent deformation. When the handle is fully screwed down, the sealing member 46 closes off the orifice 20 by firmly contacting the valve seat 22. The position of the valve in FIG. 3 can be defined as the first or pre-position, and the position of the valve in FIG. 4 can be defined as the second or closed position.

Figure 6:
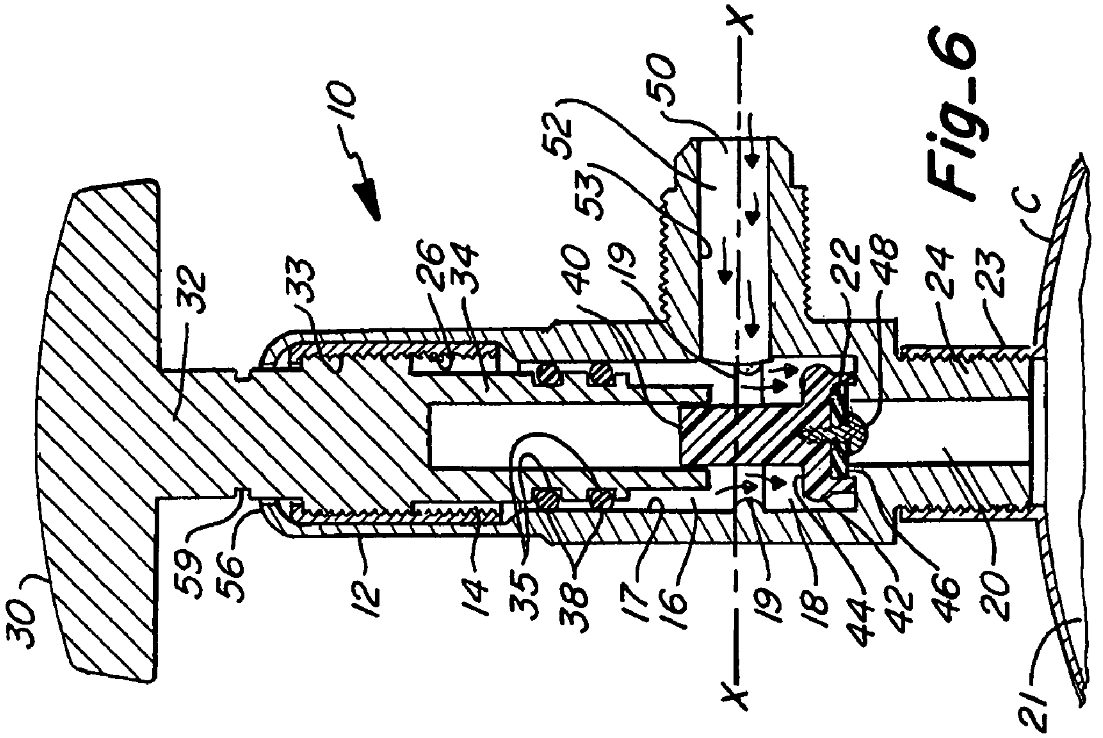
FIG. 6 is another vertical section illustrating the valve of FIG. 2 in the open position, wherein the structure of the valve prevents the pressure container from being refilled.

When it is desired to evacuate the fluid within the container, the handle 30 is unscrewed thus raising the valve stem within the chamber. The valve stem is raised to an extent which allows the sealing member 46 to separate from contact with valve seat 22. Accordingly, fluid may then flow out of the pressure container through orifice 20, lower portion 18 of the chamber, and finally back through passageway 50 of the nozzle. Because the upper portion of the valve core is freely slidable within the valve stem bore 36, the valve core 40 rises in response to the pressurized fluid within the container C. However, the constriction created by the inner concentric rim 19 prevents the valve core flange 42 from displacing above the rim 19. The valve core flange 42 is sized with respect to the inner concentric rim 19 such that pressurized fluid within the container cannot provide enough force to push or force the valve core flange 42 back above the inner concentric rim 19. The position of the valve shown in FIG. 5 can be defined as a third position, or an open position. As shown in FIG. 6, when the valve is in the open position, refilling of the container is prevented. If flow of fluid is reintroduced through passageway 50, the majority of flow through passage 50 enters the chamber above the valve core flange 42. Centerline X-X of passageway 50 illustrates that the majority of the inner concentric rim 19 lies below the centerline X-X of the passageway 50. O-rings 38 prevent flow of fluid upwardly through the valve chamber. Accordingly, the middle portion 16 of the chamber becomes pressurized thus forcing the valve core 40 downwardly in sealing engagement with valve seat 22.

Figure 5:
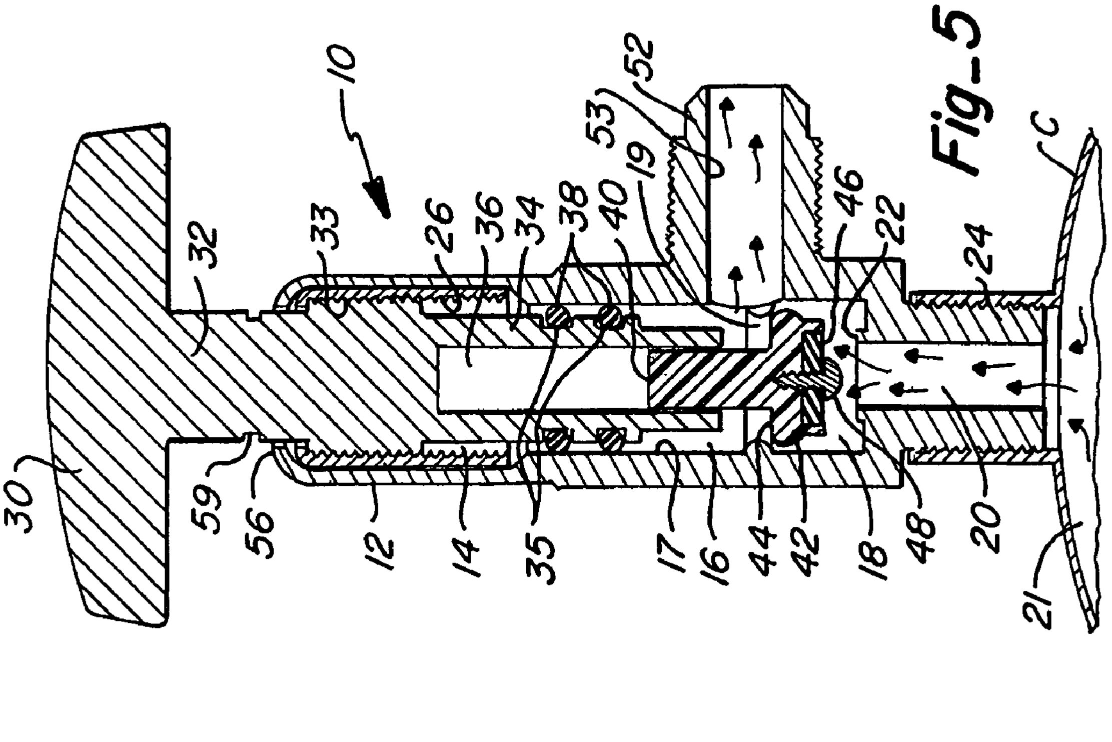
FIG. 5 illustrates another vertical section when the valve of FIG. 2 is opened thus allowing fluid flow out of the pressure container.

FIG. 5 illustrates that some fluid may escape the chamber into the passageway 50 on all sides of the valve core flange 42. This is because there is no need to effectively seal the upper edge 44 of the valve core flange 42 with respect to the inner concentric rim 19. So long as there is some gap between the inner surface 17 and the inner surface 53 defining the passageway 50, a controlled amount of fluid will be able to escape from the cylinder in the open position.

Referring now to FIGS. 7-11, a second embodiment of a non-refillable valve is shown as valve 60. As discussed in the following paragraphs, valve 60 shares a number of characteristics to valve 10 described above. Valve 60 comprises a valve body 64 that is a substantially cylindrical shaped member including a chamber 68 extending longitudinally therethrough. Valve 60 further includes a valve operating assembly 70, including a number of working parts that are received in the valve body 64 when assembled.

A handle 30 is provided for manipulating the valve operating assembly 70. The handle 30 connects to, or is integral with a valve stem 74 that extends into chamber 68 of valve body 64. As shown, an upper portion 76 of the valve stem 74 has an externally threaded area 33 that is threaded into the upper portion 80 of the chamber 68. The upper portion 80 of chamber 68 preferably includes a set of matching internal threads 84 for cooperating with the threaded area 33 of the valve stem 74. Alternatively, the upper portion 80 of the valve body 64 may include a cylindrical insert similar to that discussed above for valve 10, wherein the insert is press fit into the upper portion 80 of the valve body 64. A lower portion 88 of the valve stem 74 further extends into lower portion 72 of chamber 68, where the lower portion 72 has a substantially constant inside diameter from the bottom of the threads 84 to a location at or near the valve seat 22 at the bottom of the lower portion 72. The valve body 64 may be made of a suitable material for the pressures and type of fluid to be held in the container C to which valve 60 is attached.

The lower portion 88 of valve stem 74 includes one or more grooves 35 that have O-rings 38 mounted thereover for preventing the flow of gas between the inner surface of the chamber 68 and the exterior of the valve stem 74. As discussed in more detail below, the lower portion 88 of the valve stem 74 also has a bore 92 formed therein.

Figure 8:
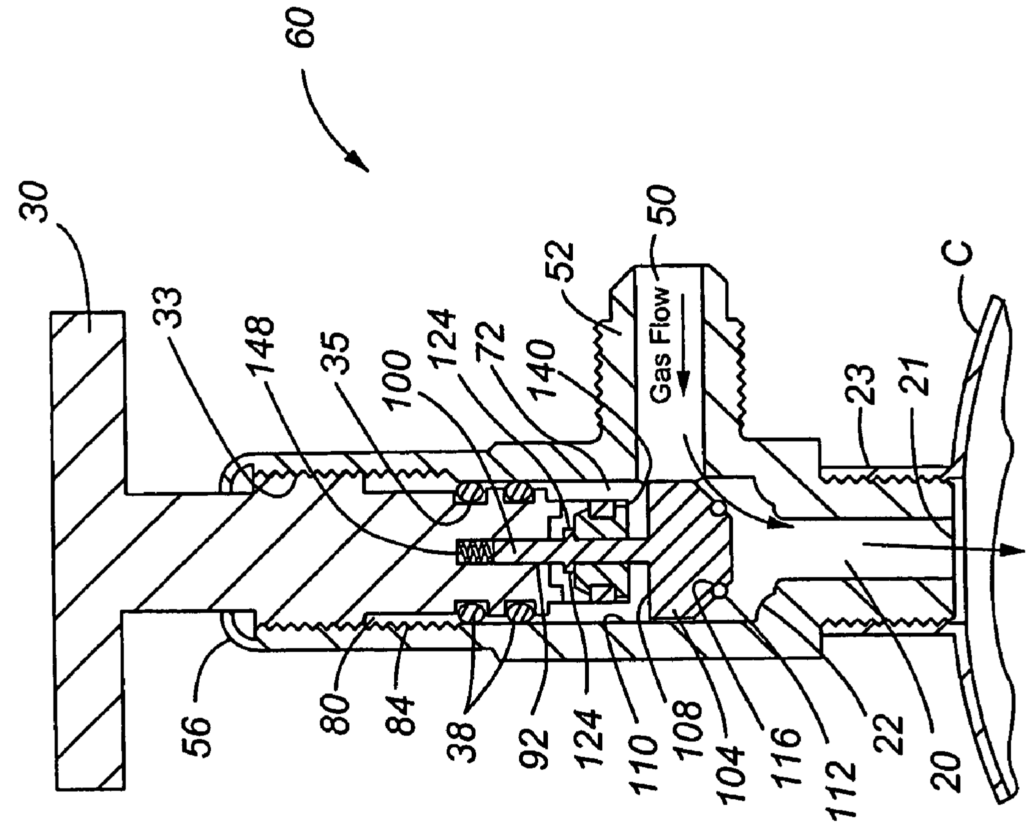
FIG. 8 is a vertical section illustrating the internal components of the valve shown in FIG. 7, and operation of the valve when the pressure container is being filled or charged.

Similar to valve 10, valve 60 includes an orifice or passageway 20 that communicates with the chamber 68, and passageway 20 communicates directly with the interior opening 21 of the pressure container C. The valve seat 22 is provided at the interface or junction between lower portion 72 of the chamber 68 and passageway 20. As shown in FIG. 8, the pressure container C preferably includes an internally threaded neck 23 that receives the threaded extension 24 of the valve body.

Referring still to FIGS. 7-11, valve 60 includes a valve core 96 that includes a portion that is slidably received within the bore 92 of the valve stem 74. More particularly, valve core 96 includes an upper cylindrical section or shaft 100 that is received within the bore 92, and includes a valve core flange 104 having a larger cross sectional area or diameter in comparison to the diameter of the shaft 100 of the valve core 96. The valve core flange 104 is further defined by a substantially flat upper edge 108. A sealing member 112 is attached at or near the distal end of the valve core 96. As shown in FIGS. 8-11, the sealing member 112 may comprise an O-ring that fits over a groove 116 at or near the distal end of the valve core flange 104. Alternatively, as described above for valve core 40 of valve 10, the sealing member may comprise a deformable material, such as a plastic or rubber disk that may be attached by a connector means, such as a screw or an adhesive, to the distal end of the valve core flange 104.

In accordance with embodiments of the present invention, the circumferential edge 106 of the valve core flange 104 is preferably not held in compression prior to initially filling the tank. That is, the circumferential edge 106 of the valve core flange 104 is not held in compression by the inside surface 110 of the lower portion 72 of chamber 68. In addition, the valve core 96 does not experience any transitional lateral compression when being moved from its initial position during filling of the container to its second position for sealing against the valve seat 22 upon advancement of the valve stem 74. More specifically, the circumferential edge 106 of the valve core 96 is not held in compression by any portion of the interior walls of the valve body 64 or chamber 68, nor is the circumferential edge 106 squeezed past a protrusion during the step of sealing the container C by advancing the valve core 96 within the valve body 64 using the valve stem 74.

Figure 7:
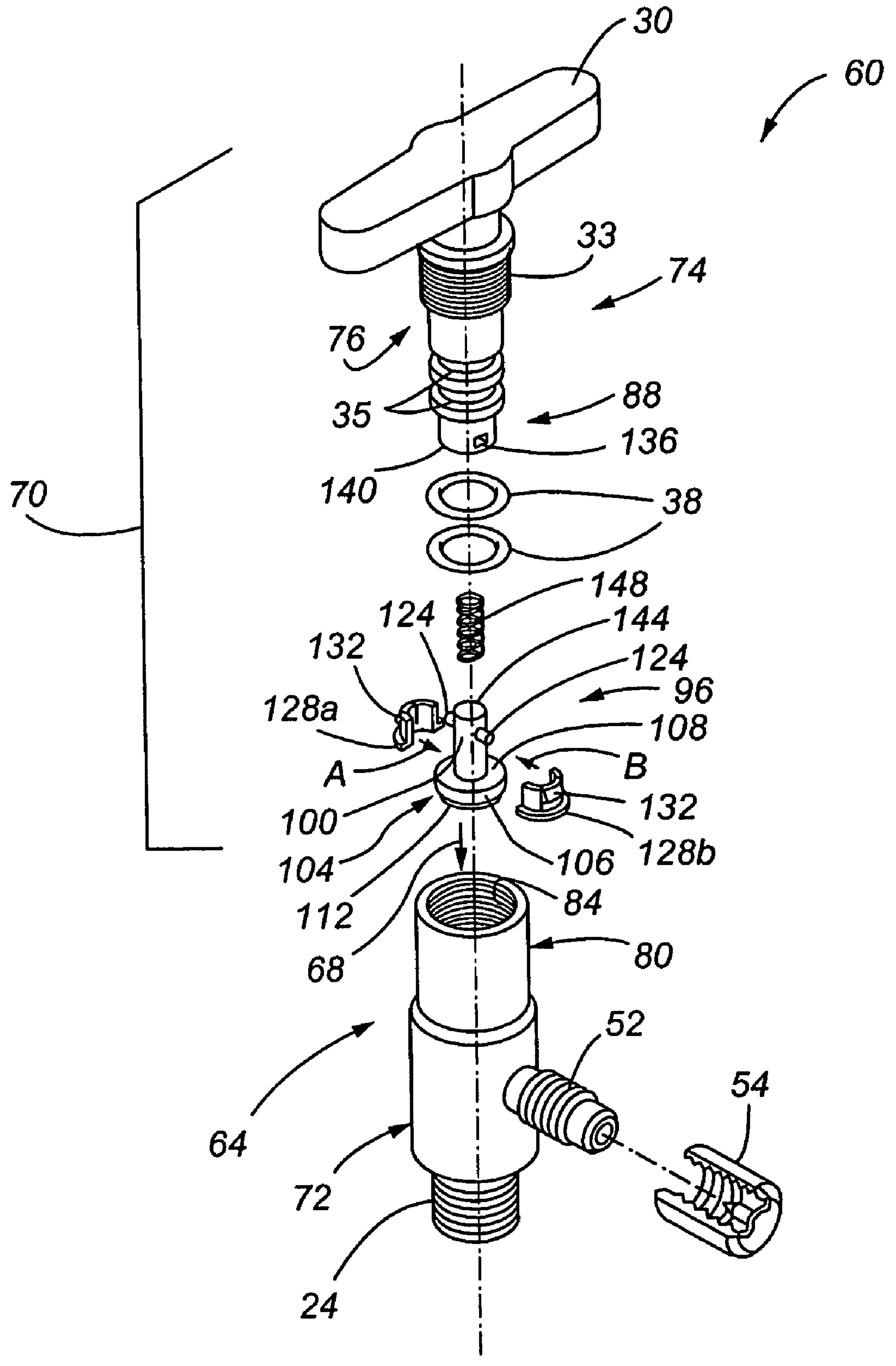
FIG. 7 is an exploded perspective view of a separate embodiment of a non-refillable valve illustrating the component parts thereof, including a fragmentary perspective view of the valve body.

The shaft 100 of the valve core 96 further includes a retaining means for holding the valve core 96 in its initial position during filling of the container C. As shown in FIGS. 7 and 8, the retaining means may comprise one or more frangible protrusions 124 connected to the shaft 100, wherein the protrusions 124 cooperate with centering spacers 128. As one skilled in the art will appreciate, a variety of structures are possible for holding the valve core 96 in an upward location while the valve is being used to initially charge or fill the container C. As for example, the retaining means may comprise one or more deformable or moveable members that are not separable structures, but that still bend or move but do not break upon advancement of the valve core 96 downward by turning the handle 30 of the valve stem 74. Alternatively, the retaining means may comprise a frangible ring, circular projection, or arcuate section of material attached to the shaft 100, or the retaining means may comprise a small mass of adhesive attached to the shaft 100, wherein the retaining means serves to hold the shaft 100, and thus the valve core 96, in position over one or more spacers 128 during filling of the container C. In yet another alternative, the one or more spacers may be detachably attached to the shaft 100 of the valve core 96. As for example, the valve core 96 and one or more spacers 128 may be interconnected by a severable material, such as a relatively thin plastic webbing or glue that may be broken with advancement of the valve stem 74.

For the embodiment illustrated in FIG. 7, two spacers 128 are used in combination with the shaft 100 and the frangible protrusions 124 to hold the valve core 96 up while the container C is initially being filled with a fluid. During manufacture of the valve 60, the spacers 128 are positioned adjacent a lower portion of the shaft 100. As shown in FIG. 7, two spacers 128*a* and 128*b* are positioned below frangible protrusions 124 and above the flat upper edge 108 of valve core flange 104. At least one of the spacers 128*a* and 128*b* is then moved during assembly of the valve proximate the shaft 100, such as in the direction of arrows A and B, and subsequently inserted into the lower portion 88 of valve stem 74. In accordance with the embodiment shown in FIG. 7, the spacers 128*a* and 128*b* may be permanently held within the lower portion 88 of the valve stem 74 using a friction fit or a clip 132 on each spacer 128*a* and 128*b*, wherein the clip 132 is received within a depression or aperture 136 of the valve stem 74.

Similar to valve 10 described above, valve 60 preferably includes a nozzle 52 extending transversely with respect to the longitudinal axis of the valve body 64. Nozzle 52 may simply be a cylindrical shaped extension including a passageway 50 that communicates directly with the chamber 68 of the valve body 64.

After the operating assembly 70 of valve 60 is inserted within the chamber 68 of the valve body 64, the upper end 56 of the valve body 64 may be crimped to retain the valve operating assembly 70 therein. Although not shown for valve 60, similar to the description above for valve 10 a safety clip may be used to prevent inadvertent actuation of handle 30. In addition, a cap 54 may be provided to cover the nozzle 52 when the valve 60 is not connected to a fluid line.

Figure 9:
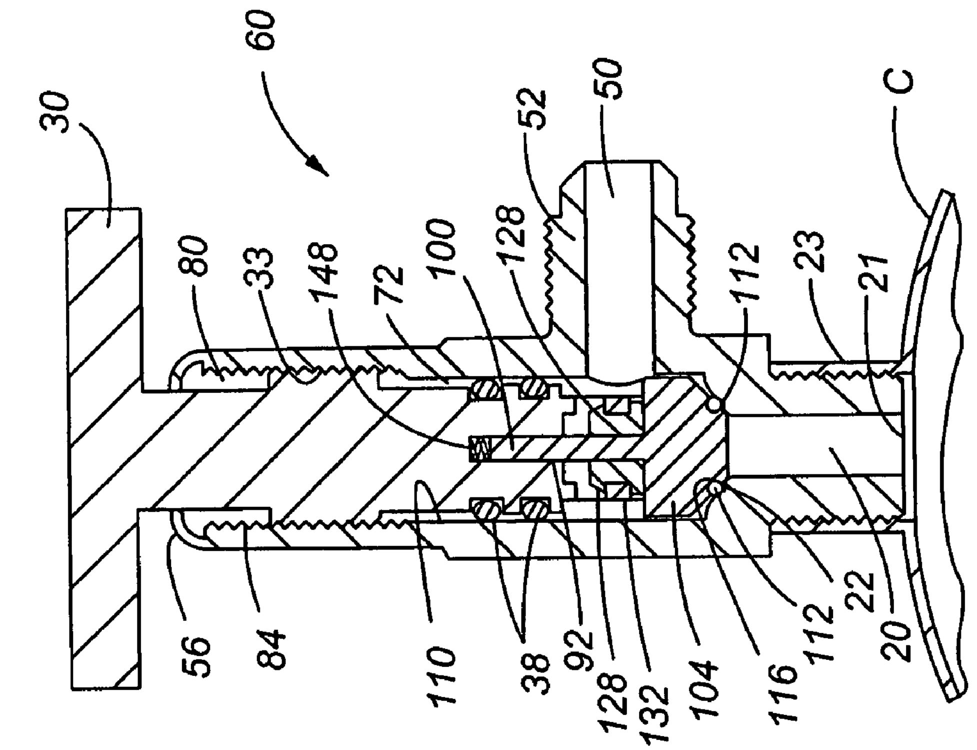
FIG. 9 is another vertical section of the valve shown in FIG. 7 illustrating the valve moved to its closed position.

Referring now to FIGS. 8-11, the operation of the valve 60 is explained. FIG. 8 illustrates the valve 60 when the cylinder C is being filled. A flow of fluid is introduced through passageway 50, through at least a part of the lower portion 72 of the chamber 68, through orifice 20 and into the interior opening 21 of the container C. The valve core 96 is held in place during filling of the container C by the retaining means, such as protrusions 124 that are operatively associated with the shaft 100 and one or more spacers 128. After the container C has been filled, the retaining clip 58 (not shown) is removed, and the handle 30 is operated to close the valve 60. More specifically, the handle 30 is rotated causing the valve stem 74 to displace downwardly into the chamber 68. As the valve stem 74 moves downward, it forces the valve core 96 downward until the distal end of the valve core flange 104 contacts the valve seat 22. After the valve core 96 stops moving downward because of contacting the valve seat 22, the shaft 100 of the valve core 96 starts to move upward within the bore 92. As the shaft 100 moves upward in the bore 92, the protrusions 124 are severed or otherwise deformed allowing the distal end 140 of the valve stem 74 to contact the flat upper edge 108 of the valve core 96, thus seating the sealing member 112 against the valve seat 22, as depicted in FIG. 9. In addition, the upper end 144 of the shaft 100 of the valve core 96 at least partially compresses a biasing member or spring 148 that resides in the upper end of the bore 92. Thus, when the handle is fully screwed down, the sealing member 112 closes off the orifice 20 by firmly contacting the valve seat 22. The position of the valve 60 in FIG. 8 can be defined as the first or pre-position, and the position of the valve 60 in FIG. 9 can be defined as the second or closed position.

When it is desired to release the fluid within the container C, the handle 30 is unscrewed thus raising the valve stem 74 within the chamber 68. The valve stem 74 is raised to an extent that allows the sealing member 112 to separate from contact with valve seat 22. Because the shaft 100 of the valve core 96 is slidable within the valve stem bore 92, the valve core 96 rises in response to the pressurized fluid within the container C. Accordingly, fluid may then flow out of the pressure container C through orifice 20, lower portion 72 of the chamber 68, and finally back through passageway 50 of the nozzle. Fluid may escape the lower portion 72 of chamber 68 into the passageway 50 on all sides of the valve core flange 104. So long as there is some gap between the inside surface 110 of the lower portion 72 of chamber 68 and the inner surface 53 defining the passageway 50, a controlled amount of fluid will be able to escape from the cylinder C in the open position. The position of the valve 60 shown in FIG. 10 can be defined as a third position, or an open position.

Figure 11:
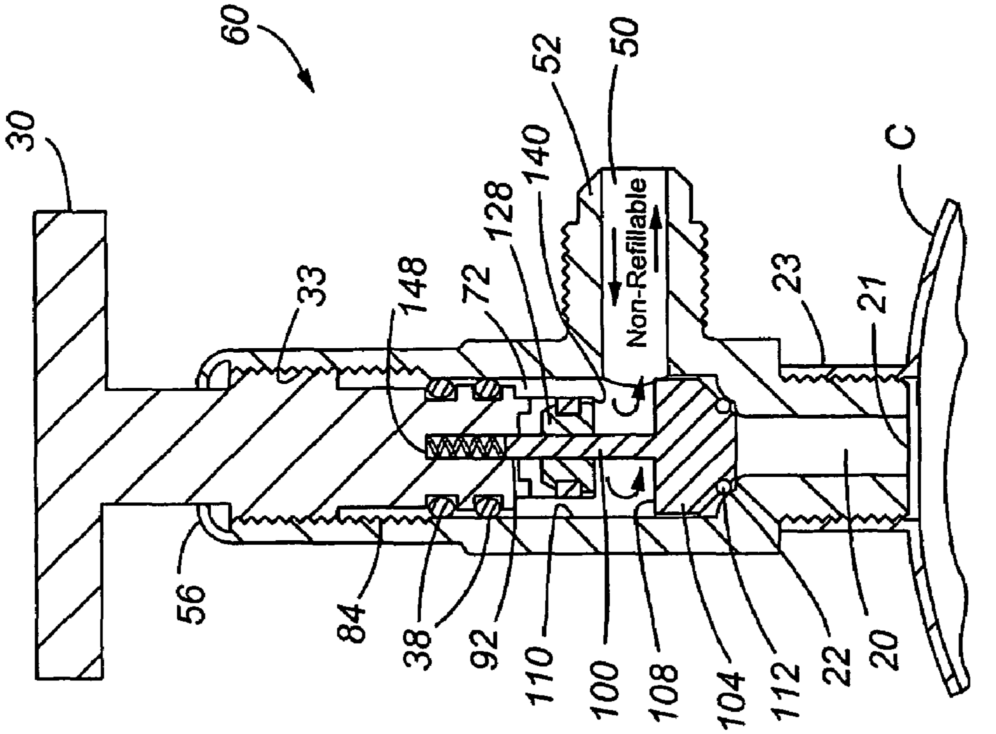
FIG. 11 is another vertical section illustrating the valve shown in FIG. 7 in the open position, wherein the structure of the valve prevents the pressure container from being refilled.
Figure 10:
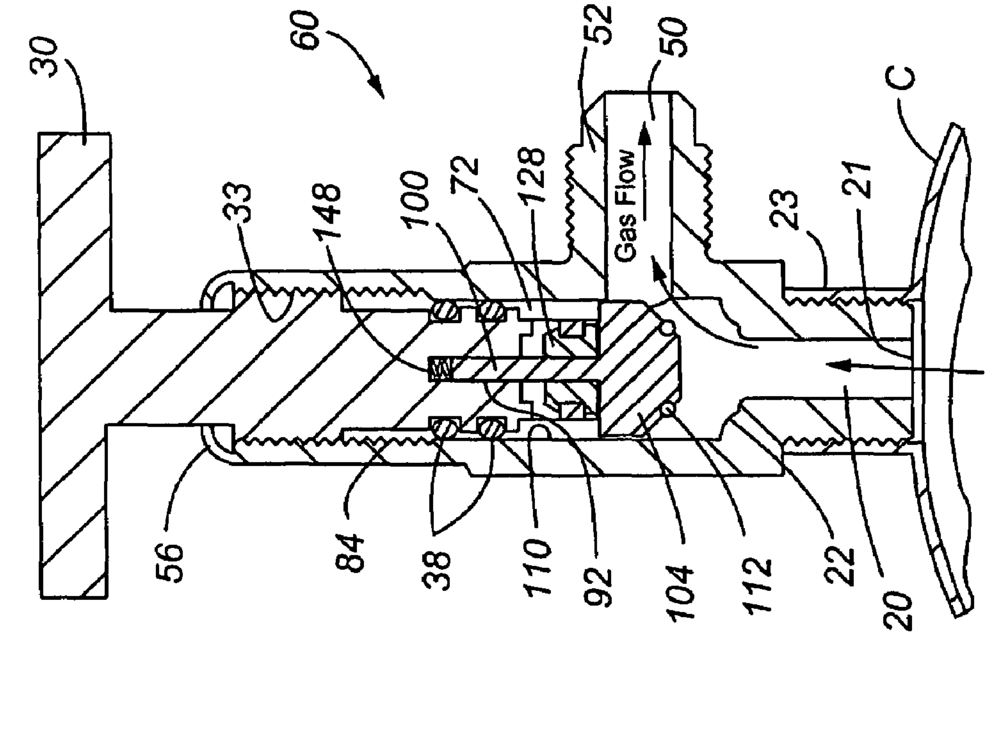
FIG. 10 illustrates another vertical section of the valve shown in FIG. 7 when the valve is opened thus allowing fluid flow out of the pressure container.

As shown in FIG. 11, when the valve 60 is in the open position, refilling of the container C is prevented. If flow of fluid is reintroduced through passageway 50, the spring 148 within bore 92 forces shaft 100 of the valve core 96 downward, wherein the fluid that is used to attempt refilling of the container C forces the valve flange 104 downward so that the sealing member 112 of the valve core 96 engages the valve seat 22 and prevents refilling of the container C. Of course, if the valve 60 is oriented in an upright position and the container C does not contain a pressurized fluid, the valve core 96 will be resting on the valve seat 22 when refilling is attempted. However, if the valve 60 and container C is inverted, the biasing member or spring 148 has a sufficient stiffness in combination with the location of the valve core flange 104 when in the open position to allow the fluid to act on the flat upper edge 108 of the valve core 96 to force the valve core 96 downward to contact the valve seat 22. In accordance with embodiments of the present invention, the valve core 96 may be positioned such that a majority of refill fluid flow through passage 50 enters the lower portion 72 of the chamber 68 above the valve core flange 104. Accordingly, the lower portion 72 of chamber 68 becomes pressurized, thus forcing the valve core 96 downwardly in sealing engagement with valve seat 22.

Although the invention has been primarily described for use with a compressed gas container, the invention can also be used with other pressurized fluid containers or other pressurized liquid systems.

The simple design of the various embodiments of the non-refillable valve allow the valve to be positioned in either an open or closed position, and also automatically prevent refill of the container by the independent movement of the valve core with respect to the valve stem. For embodiments described herein, the simple sliding relationship between the valve stem and valve core allows the valve to function as a check valve to prevent refilling of the container.

The valve stem may be machined of durable, lightweight metal such as aluminum. The valve core may be constructed of a suitably strengthened plastic or rubber. The sealing member itself is preferably made of a resilient rubber or plastic material.

Although the invention has been described with respect to a preferred embodiment, it shall be understood that the invention is not so limited because other variations and modifications are intended to be covered within the spirit and scope of the invention.

What is claimed is:

1. A non-refillable valve for use with a pressure container, said valve comprising:

a valve body having an inside surface defining a longitudinally extending chamber extending therethrough, said chamber having a lower portion communicating with the pressure container to allow filling and selective discharge of said container, said chamber including a valve seat positioned in said lower portion of said chamber, and a transverse opening formed in said valve body and communicating with said valve chamber;

a valve stem disposed in said chamber and being movable in said chamber;

a valve core communicating with said valve stem, said valve core comprising at least one frangible protrusion for maintaining an initial position of said valve core during initial filling of the container, said valve core further including a flange at a distal end of said valve core, said flange comprising a sealing member for forming a seal with said valve seat;

a biasing member residing within a bore of said valve stem; and at least one O-ring abutting said inside surface of said valve body for sealing said valve stem with respect to said valve body;

wherein when said valve core is in said initial position, a flow of fluid may pass through said opening and said chamber to fill the container, and wherein said valve core prevents refilling of the container after breaking said frangible protrusion.

2. The valve as claimed in claim 1, wherein said frangible protrusion resides on a shaft of said valve core.

3. The valve as claimed in claim 2, further comprising at least one spacer abutting said frangible protrusion when said valve core is in said initial position.

4. The valve as claimed in claim 3, wherein said spacer is located between said frangible protrusion and said flange of said valve core when said valve core is in the initial position.

5. The valve as claimed in claim 4, wherein said spacer comprises at least one clip for attaching said spacer to a distal end of said valve stem.

6. The valve as claimed in claim 1, wherein said biasing member comprises a spring.

7. The valve as claimed in claim 1, wherein said lower portion of said chamber substantially extends between an upper threaded portion of said chamber and the valve seat, and wherein said lower portion comprises a substantially uniform diameter.

8. The valve as claimed in claim 1, wherein said flange of said valve core is not compressively held by said inside surface of said lower portion of said chamber when said valve core is in said initial position.

9. The valve as claimed in claim 1, wherein the valve core is not laterally compressed during transitioning from the initial position to a second position for contacting said valve seat.

10. The valve as claimed in claim 1, wherein said biasing member urges said valve core toward said valve seat when a refilling of the pressure container is attempted.

11. A non-refillable valve for use with a pressure container, said valve comprising:

means for containing defining a chamber, said chamber having a proximal end and a distal end;

means for metering including a portion within said chamber;

means for preventing fluid flow between an inside surface of said chamber and said means for metering;

means for sealing positioned in the chamber, the means for sealing being moveable from an initial position for filling the pressure container to a second position for sealing the container; and means for retaining operatively associated with of said means for sealing and said means for metering, said means for retaining holding said means for sealing in the initial position;

wherein (i) the means for sealing is not laterally compressed by an inside surface of said chamber in the initial position, (ii) the means for sealing is not laterally compressed during transitioning from the initial position to the second position, and (iii) the means for sealing is disposed against a seat located at the distal end of the chamber thereby forming a seal that prevents refilling of the pressure container.

12. The valve as claimed in claim 11, further comprising means for biasing said means for sealing toward said means for seating.

13. The valve as claimed in claim 11, wherein a lower portion of said chamber comprises a substantially uniform inside diameter within a length occupied by said means for sealing.

14. The valve as claimed in claim 11, wherein said means for retaining comprises a frangible member.

15. A non-refillable valve for use with a pressure container, said valve comprising:

a valve body having an inside surface defining a longitudinally extending chamber extending therethrough, said chamber having (i) a lower portion having a substantially uniform diameter and communicating with the pressure container to allow filling and selective discharge of said container, (ii) a valve seat positioned in said lower portion of said chamber, (iii) a transverse opening formed in said valve body and communicating with said valve chamber, and (iv) said lower portion of said chamber extending between an upper threaded portion of said chamber and the valve seat;

a valve stem disposed in said chamber and being movable in said chamber, said valve stem having threads for cooperating with said upper threaded portion of said chamber;

a valve core communicating with said valve stem, said valve core comprising a flange having a sealing member for forming a seal with said valve seat;

means for retaining said valve core in an initial position during initial filling of the container; and means for preventing fluid flow between said inside surface of said valve body and said valve stem;

wherein when said valve core is in said initial position, a flow of fluid may pass through said opening and said chamber to fill the container, and wherein said valve core prevents refilling of the container after said valve core is moved from said initial position to a closed position at said valve seat.

16. The valve as claimed in claim 15, further comprising means for biasing said valve core toward said valve seat, said means for biasing located within a bore of said valve stem and operatively associated with said valve core.

17. The valve as claimed in claim 15, further comprising a spring for urging said valve core toward said valve seat when refilling of the pressure container is attempted.

18. The valve as claimed in claim 15, wherein said valve core is not compressively held by said inside surface of said lower portion of said chamber when said valve core is in said initial position.

19. The valve as claimed in claim 15, wherein the valve core is not laterally compressed during transitioning from the initial position to a second position for contacting said valve seat.

20. The valve as claimed in claim 15, wherein a majority of the cross-sectional area of the transverse opening is located above the flange of the valve core when the pressure container does not contain a pressurized fluid.

* * * * *